United States Patent [19]

Lund

[11] Patent Number: 4,768,762
[45] Date of Patent: Sep. 6, 1988

[54] MEANS AND METHOD TO COUNTERBALANCE THE WEIGHT OF A BODY

[76] Inventor: Kurt O. Lund, 135 Sixth St., Del Mar, Calif. 92014

[21] Appl. No.: 52,113

[22] Filed: Apr. 27, 1987

Related U.S. Application Data

[63] Continuation-in-part of Ser. No. 734,044, May 15, 1985, abandoned.

[51] Int. Cl.⁴ .............................. F16F 1/06; F16F 1/12
[52] U.S. Cl. ....................................... 267/172; 16/1 C; 74/592; 108/2; 108/136; 267/173; 248/289.3; 248/292.1; 248/572
[58] Field of Search ............... 267/172, 173, 179, 127; 16/1 C; 74/592; 248/572, 280.1, 292.1, 297.1, 162.1, 123.1, 289.3, 441.1, 124; 108/2, 4, 6, 136, 144, 146; 33/438, 440, 442; 49/386; 126/191, 194

[56] References Cited

U.S. PATENT DOCUMENTS

| | | | |
|---|---|---|---|
| 1,736,784 | 11/1929 | Gloekler | 16/1.6 X |
| 1,776,261 | 9/1930 | Kreissig | 267/172 X |
| 2,178,122 | 10/1939 | Ostler et al. | 267/172 X |
| 2,480,865 | 9/1949 | Lofstrand | 74/517 |
| 2,947,019 | 8/1960 | Liesse | 267/172 X |
| 3,177,975 | 4/1965 | Galli | 267/172 X |
| 3,269,035 | 8/1966 | Bong | 74/592 X |
| 3,826,204 | 7/1974 | Kuhlmann et al. | 108/2 |
| 3,874,309 | 4/1975 | Cowley | 108/2 |
| 3,903,812 | 9/1975 | Cowley | 108/2 |
| 3,908,560 | 9/1975 | Horner | 108/2 |
| 3,908,561 | 9/1975 | Cowley | 108/2 X |
| 4,360,180 | 11/1982 | Bruneau | 108/146 X |
| 4,434,721 | 3/1984 | Shelton et al. | 108/4 |
| 4,582,304 | 4/1986 | Reichert | 267/127 X |
| 4,651,652 | 3/1987 | Wyckoff | 108/144 |
| 4,653,975 | 3/1987 | Akeel | 74/592 X |
| 4,667,605 | 5/1987 | Bastian | 108/144 |
| 4,685,648 | 8/1987 | Dobner et al. | 248/572 X |
| 4,726,555 | 2/1988 | Andrews | 248/124 X |

FOREIGN PATENT DOCUMENTS 1189824  3/1965  Fed. Rep. of Germany.

Primary Examiner—Douglas C. Butler
Attorney, Agent, or Firm—Duane C. Bowen

[57] ABSTRACT

The weight of a pivoted body is counterbalanced by a spring acting on a cam connected to that body to pivot therewith. A band, connected to that spring, attaches to the cam and wraps around the cam. The cam's profile is contoured to produce moment arms of various lengths, through which the force of the spring acts, balancing the variable torque of the weight of the pivoted body.

2 Claims, 2 Drawing Sheets

MEANS AND METHOD TO COUNTERBALANCE THE WEIGHT OF A BODY

This is a continuation-in-part of copending application Ser. No. 734,044 filed on 5/15/85, now abandoned.

BRIEF SUMMARY OF THE INVENTION

Background and Objectives

My invention relates to a means and method to counterbalance the weight of a body by employing a specially shaped cam to provide a varying length moment arm and by employing a linear a nonlinear spring acting on that moment arm.

The present patent application is a continuation-in-part of the previous patent application by the same inventor and with the same title, Ser. No. 734,044, filed 5/15/85. The previous patent application was described in terms of a linear spring. A linear spring is a spring in which the force developed is a linear function of extension or compression. These are the most common springs in use. Nonlinear springs in production require special manufacture and are more expensive than linear springs. However, the invention is not limited to linearity between spring force and displacement.

Loads counterbalanced by springs occur in countless modern-day devices in home and industry; for example, in the balancing of the weight of an oven door, or the positioning of a drafting table. A common shortcoming of these spring balance systems is that the object (e.g., door, table) is in balance with the spring force for only one position (or a limited range of positions) of its total motion (travel); thus, the object requires additional force to overcome its weight in some positions, while in other positions additional force is required to overcome the unbalanced action of the spring. A common property of these devices is that their weights act, through the force of gravity, at non-constant distances from the pivoting point, thus producing a torque about the pivot which varies with angular position. It is an objective of my invention to counterbalance such weights producing varying torques. More specifically, it is an objective of my invention to balance these variable torques (produced by a constant weight in a preferred embodiment), with a force produced by a linear or nonlinear spring connected to a flexible member wrapped upon a special cam profile.

A linear spring is one in which the force exerted by the spring varies in direct proportion to the extension (compression) of the spring. Since this is the property of the elastic materials (steel) from which springs are usually made, linear springs are the most economical and convenient springs to use in technological applications. It is an objective of my invention to counterbalance such pivoting weights with the forces of springs. By special spring design, the spring can also have nonlinear behavior and it is a further objective to counterbalance with either linear or nonlinear springs.

The general concept of wrapping a spring-connected flexible member over a cam profile, to produce a constant torque with angular position of the cam, was known several centuries ago. The fusee was widely used in the 18th Century clock mechanisms to equalize the force of the spring. In present times, a number of patents have been issued for diverse applications of the concept of utilizing cam profiles for constant torque configurations. Hitherto, cam profiles have not appeared which balance variable torques and it is an objective of my invention to provide a cam profile that will balance variable torques.

In the present invention, the spring force acts on a cam profile, fixed to an arm supporting weight W at a distance b from its pivot point, and inclined at an angle $\theta$ from the vertical. In this case the torque about the pivot point, $T = Wb \sin \theta$, is to be balanced by the spring force for every position, $\theta$, within the range of motion, by means of a suitably derived cam profile. Applications of this mechanism, balancing a weight pivoted at one end, could range from the delicate balancing of a gramma-phone (turntable) tone arm to the counterbalancing of an automotive drawbridge. Here, such a mechanism is invented which has general technological application.

My invention will be best understood, together with additional advantages and objectives thereof, when read with reference to the drawings.

DRAWINGS

GENERAL DESCRIPTION

Figure 1:
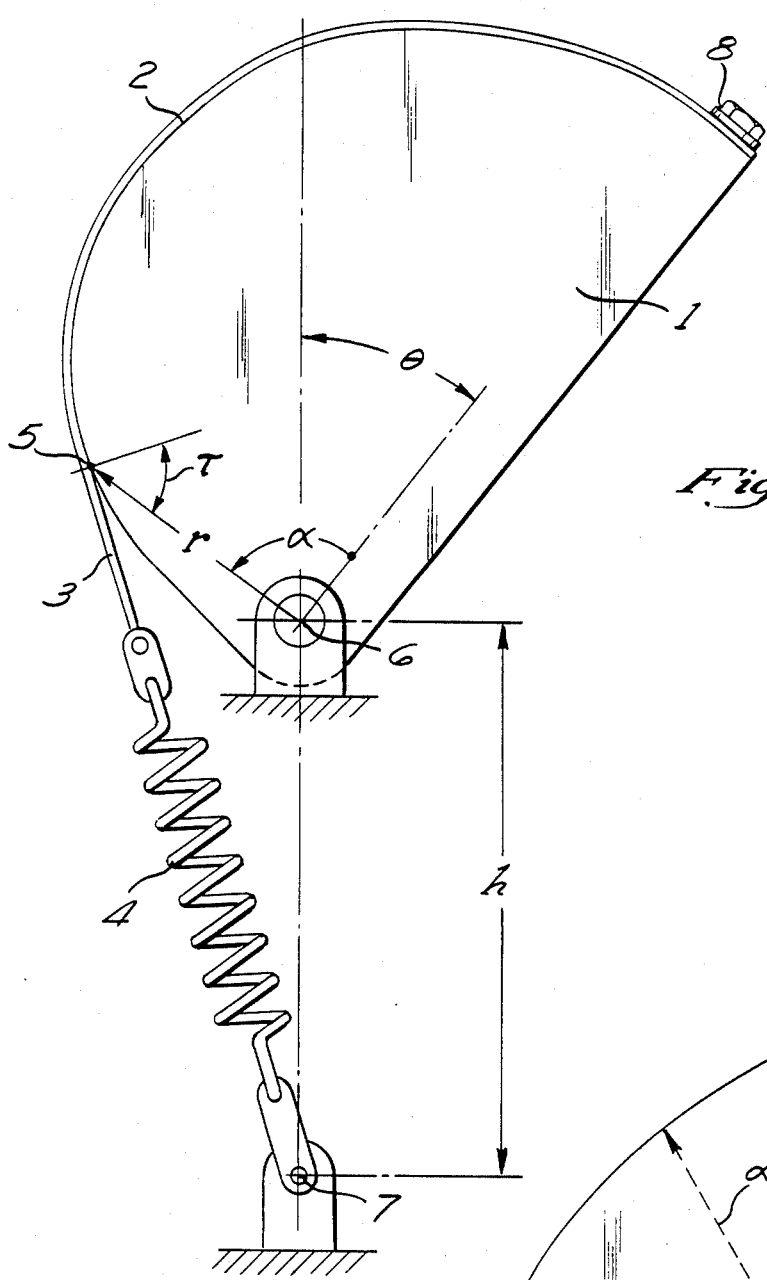
FIG. 1 is a schematical view of a cam, a band wrapped on the cam, and a spring attached to the band, showing a specific embodiment of my invention.

The drawings present the invention schematically. As previously indicated, the invention applies to a pivoted body, such as an oven door, an adjustable drafting table, a turntable tone arm, an automotive drawbridge, etc., pivoting about an axis 6. The pivoting body is represented by an arm 12, which could be one span of a drawbridge, a tone arm, the support arm for the planar drafting surface of a rapidly adjustable drafting table, an automobile trunk door or hood, etc. The weight of the pivoting body plus a possible attached weight is represented by the vertical vector W. If arm 12 were actually the pivoted body, of uniform cross-section, of course the vector W would be midway of the length of arm 12, rather than at its end, as will be understood. Note that as arm 12 pivots, the vector W changes in horizontal distance from pivot axis 6, meaning that the moment arm changes, meaning the torque (weight times moment arm) changes, and meaning that the counterbalancing (equal and opposite) torque needs to change correspondingly. Part of my invention is the comprehension that the above is true: that the pivoting bodies can only be counterbalanced with a force of spring 4 if the torque resulting from force 4 varies correspondingly to the variance of the torque of the pivoting body, meaning that if force 4 is applied to a cam 1, the effective moment arms through which force 4 is applied must vary correspondingly to the variance of the torque of the pivoting body.

Cam 1 represents one or more cams and spring 4 represents one or more springs, i.e., when the drafting surface of a drafting table is being counterbalanced, for example, the design could use a single cam and spring at one end of the pivotal axis or midway of the pivotal axis, or the design could use a cam and a spring at each end, etc.

Figure 2A:
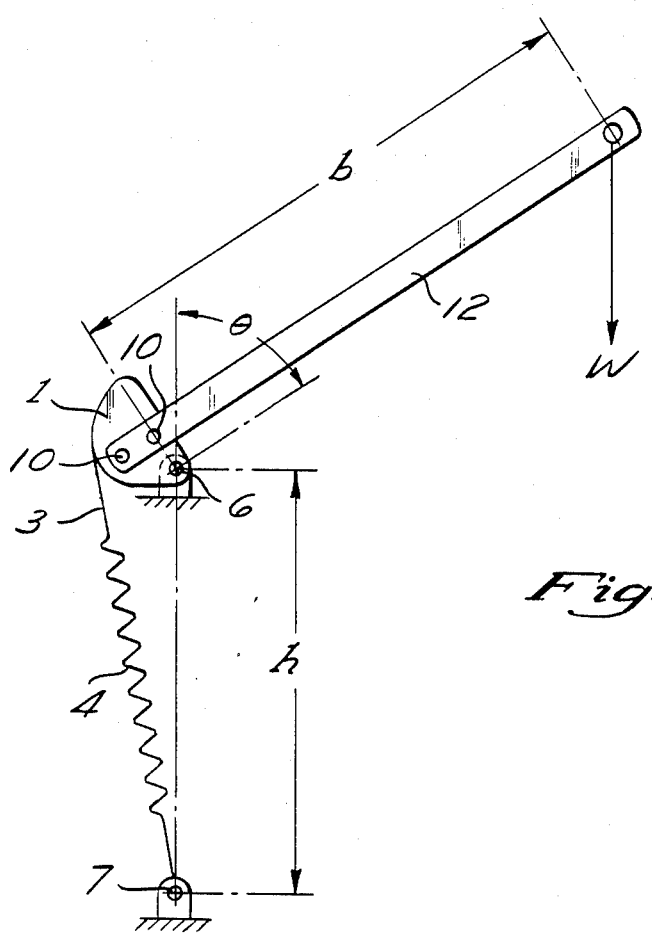
FIG. 2(a) is a schematical view of the type of mechanism shown in FIG. 1 but also including an arm attached to the cam and a weight acting on the arm.
Figure 2B:
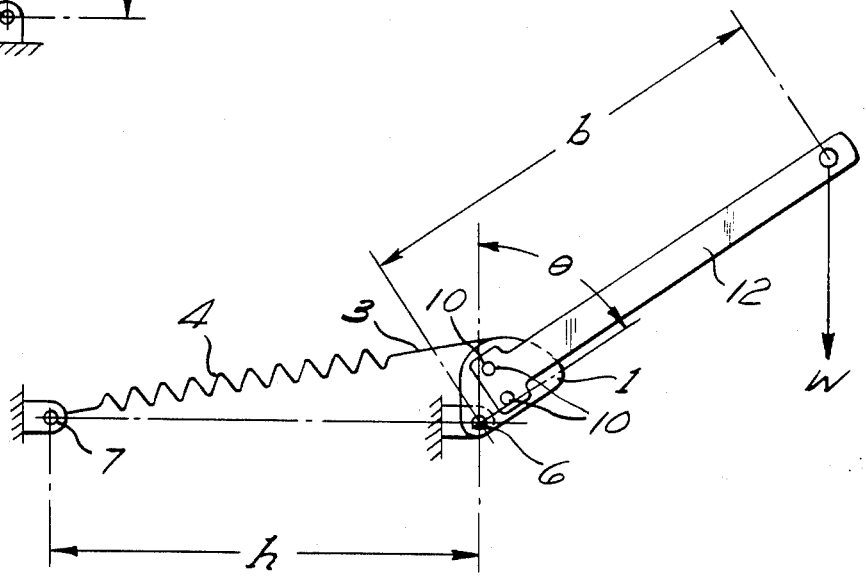
FIG. 2(b) is like FIG. 2(a) but shows the spring extending generally horizontally rather than generally vertically.

Spring 4 acts on cam 1 through use of a flexible member or band 3, wrapping on the profile 2 of cam 1, touching cam 1 at a succession of points 5 as arm 12 pivots. In FIG. 2(a) spring 4 is oriented generally vertically and in FIG. 2(b) spring 4 is oriented generally horizontally. Such orientation is immaterial as long as the force of spring 4 is directed to oppose the direction of torque of weight W, i.e., the torque due to weight W being clockwise and the torque due to spring 4 being counterclockwise as viewed in the drawings.

One reason, other than a failure of perception, why it is new in the art to provide a cam 1 with such a profile 2 as to balance the torque due to the weight W of a pivoted body, when acted upon by the force of a spring 4 acting through a band 3 wrapped around cam 1 is that there are only two ways to define such a profile 2: (a) Empirically, on a cut-and-fit basis. Experimental or graphical solution to defining cam profile 2 would be exceedingly laborious even if the end product came close enough to be workable. Even if such a profile had some minor inaccuracies, friction or bind in pivoting parts might compensate so that the pivoted body would be stable at various pivoted positions. (b) Mathematically. The difficulty with a mathematical solution to the problem of defining the proper profile 2 of cam 1 is that the differential equations (1), (2), (3), set forth hereafter, defining profile 2, were impractical numerically to integrate before the advent of digital computers. Because of their non-linearity, these equations (1), (2) and (3) can only be solved numerically: their solution prior to the availability of computers would not have been possible. Even with the use of a modern-day computer, the equations proved difficult to solve and many instability and convergence problems were experienced. Considerable mathematical detail was required to obtain the system of non-linear differential equations (1), (2), and (3) describing cam profile 2. My invention includes (i) analyzing the problem of balancing a force or weight acting on a hinged or pivoted member (including the weight of the member itself), to comprehend that a non-uniform torque is involved, (ii) comprehending that a counter-balancing torque could be provided by use of a spring acting on a cam of suitable profile, and (iii) understanding that the suitable profile could be defined by non-linear differential equations.

It will be understood that arm 12 (or the pivoted body) can be secured directly to cam 1 with suitable fasteners 10 or arm 12 (or the pivoted body) could be indirectly connected to cam 1, such as by connection to a common rotary body, such as a shaft, having axis 6 as its axis of rotation.

SUMMARY OF THE INVENTION

This invention operates on the principle of converting the extension or compression of a spring 4, as shown in FIG. 1, to the rotation of a rigid body (cam) 1. The cam is shown in FIG. 1 as being free to rotate about point 6, and as rotated through angle $\theta$(theta), measured from a fixed vertical reference line. The cam profile 2 provides the seat for the flexible, but inextensible, band or chord 3. The band 3, wrapped on the cam profile 2, has one end connected to one end of the spring 4, and the other end fixed to the cam 1 at point 8; the other end of the spring 4 is connected to pivot point 7.

As the cam 1 rotates through angle $\theta$ the band 3 is wrapped upon the profile 2, thus extending spring 4. Extension of the spring produces a tensile force acting through point 5 where the band just touches the cam (a compression spring can also be made to produce tensile force). Point 5 on the cam is defined by the radius vector r, and angle $\alpha$(alpha) which is measured from a point fixed on the rotating cam, as shown. Now, the spring force acting about point 6, through the projection of radius r, develops a torque, $T_s$, about point 6 which varies according to the degree of rotation, $\theta$, and according to the cam profile, defined by the function $r(\alpha)$. For a device in which the torque applied to the cam is specified as the function $T_a(\theta)$, the problem is to find the corresponding cam profile $r(\alpha)$, for a suitable spring, such that $T_s = T_a$ for all positions, $\theta$. This invention determines the differential equations from which $r(\alpha)$ can be found for a specified function $T_a(\theta)$. Moreover, for a preferred embodiment, a general cam profile and spring combination is obtained for application to all designs of that embodiment.

For the mathematical solution of the equations describing the cam profile, it is convenient to state the equations and variables in nondimensional terms. In this way a general profile is obtained which can be scaled up or down for application to any size of device. Thus, at the initial position of the cam, $\theta_o$, the length of the radius vector is $r_o$ (distance between points 5 and 6), and the nondimensional radius is defined by $(\rho)\epsilon = r/r_o$; the nondimensional applied torque (or moment) is defined by $m = T_a/T_o$, where $T_o$ is a constant with dimensions of torque to be defined for a particular embodiment. With these variables the system of differential equations defining the cam profile is given by $$\frac{d\rho}{d\theta} = \rho \tan\tau, \tag{1}$$

$$\frac{d\tau}{d\theta} = \frac{\frac{dm}{d\theta} - m\tan\tau - k\rho^2(\cos^2\tau + \epsilon\rho\sin\tau)}{-m\tan\tau + k\rho^2(\sin^2\tau - \epsilon\rho\sin\tau)}, \tag{2}$$

$$\alpha = \theta + C - \tau + \epsilon\rho\cos\tau, \tag{3}$$

where $\tau$(tau) is the angle between the radius vector and the normal to the cam profile at point 5, as shown in FIG. 1. In these equations $\kappa$(kappa) is the nondimensional spring constant $$\kappa = kr_o^2/T_o,$$

where k is the spring rate in, say, pounds per inch; $\epsilon$(epsilon) is the length ratio $$\epsilon = r_o/h$$

where h is the distance between points 6 and 7 (see FIG. 1). With m specified as a function of $\theta$, and $\kappa$ and $\epsilon$ specified parameters, equations (1) to (3) can be integrated to yield $\rho$, $\tau$, and $\alpha$ as functions of $\theta$; hence, by comparing $\rho$ and $\alpha$ values, the cam profile is determined.

Further, h is the distance between the horizontal axis and the fixed anchor. $\theta$ is the degree of rotation. $r_o$ is the maximum distance of the radius vector. P (rho) is defined by:

$$P = r/r_o$$

r is the length of the radius vector at any cam angle. The nondimensional applied torque or moment is defined by:

$$m = T_a/T_o$$

$T_o$ is a constant with dimensions of torque dependent on a particular embodiment. $T_a$ is the applied varying torque resulting from the weight pivoting about the horizontal axis. The radius vector extends from the horizontal axis to the point of tangency of the flexible member and the cam profile. A (alpha) is the angle between the radius vector and a line from the horizontal axis to the point of application of the vertical vector representing the weight of the body. Angle C varies between $\pi/2$ radians for generally vertical orientation of the spring force and zero radians for generally horizontal orientation of the spring force.

Figure 3:
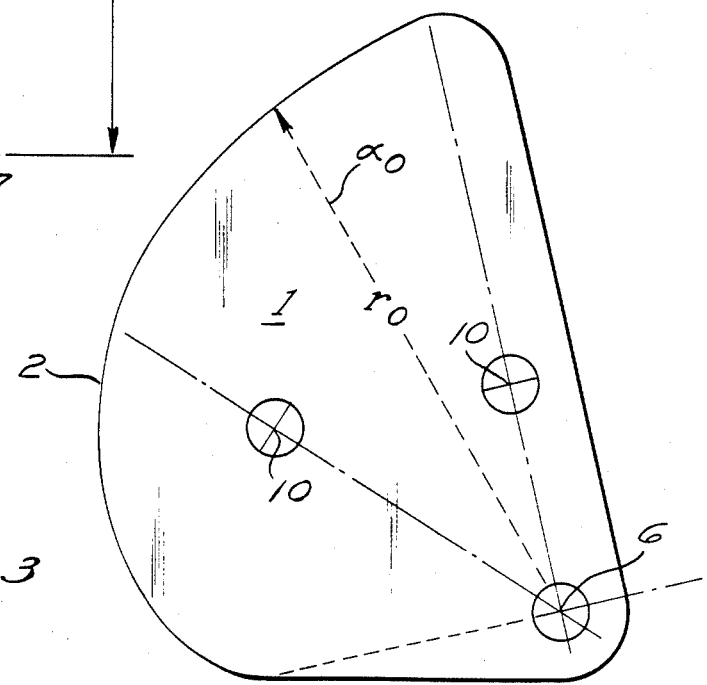
FIG. 3 shows an example of a profile of a cam in the proportions it would have for certain values to be given in the later description.

Preferred embodiments are shown in FIG. 2, where the applied torque arises from weight W, acting at effective distance b from the cam rotation axis. In this case $T_a(\theta) = Wb \sin \theta$; selecting $T_o = Wb$, we have $m = \sin \theta$, $(dm/d\theta) = \cos \theta$ and $\kappa$ $r_o^2/Wb$. A cam profile for these embodiments is shown in FIG. 3. In the case of a nonlinear spring K would not be a constant, as in the foregoing example, but a specified function of spring extension or compression.

The cam profile of FIG. 3 is generally to proportion, although not to scale, for the values $\kappa = 1.0$, $\epsilon = 0.14$, $r_o = 5.09''$.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. A mechanism to counterbalance the weight of a body, comprising:
   (a) said body being supported to pivot about a horizontal axis so that a vertical vector representing said weight of said body varies in horizontal distance from said axis during pivoting of said body thereby varying torque about said axis resulting from said weight,
   (b) a cam connected to said body and turning about said axis with said body during pivoting of said body about said axis,
   (c) a fixed anchor and a flexible member extending between and attached to said anchor and a point on said cam, said flexible member including a spring, said flexible member being disposed to wind on and off said cam as said body pivots, and
   (d) said cam being contoured to produce moment arms of various distances from said axis through which the force of said spring acts and producing torque equal and opposite to the torque resulting from said weight during pivoting of said body, the cam profile being defined by:

$$\frac{dP}{d\theta} = P \tan T, \tag{1}$$

$$\frac{dT}{d\theta} = \frac{\frac{dm}{d\theta} - m \tan T - KP^2(\cos^2 T + EP \sin T)}{- m \tan T + KP^2(\sin^2 T - EP \sin T)}, \tag{2}$$

$$A = \theta + C - T + EP \cos T, \tag{3}$$

where T (tau) is the angle between the radius vector and the normal to the cam profile at successive points; where K (kappa) is the nondimensional spring parameter:

$$K = kr_o^2/T_o,$$

where k is the spring rate; where E (epsilon) is the length ratio: $E = r_o/h$,
where h is the distance between said horizontal axis and said fixed anchor; where $\theta$ is the degree of rotation; where $r_o$ is the maximum distance of the radius vector; where P (rho) is defined by:

$$P = r/r_o,$$

where r is the length of the radius vector at any cam angle; where the nondimensional applied torque or moment is defined by:

$$m = T_a/T_o,$$

where $T_o$ is a constant with dimensions of torque dependent on a particular embodiment; where $T_a$ is the applied varying torque resulting from said weight pivoting about said horizontal axis; where said radius vector extends from said horizontal axis to the point of tangency of said flexible memer and said cam profile; where A (alpha) is the angle between said radius vector and a line from said horizontal axis to point of application of said vertical vector representing said weight of said body; where angle C varies between $\pi/2$ radians for generally vertical orientation of said spring force and zero radians for generally horizontal orientation of said spring force.

2. The method of counterbalancing the weight of a body, comprising:
   (a) supporting said body to pivot about a horizontal axis so that a vertical vector representing said weight of said body varies in horizontal distance from said axis during pivoting of said body thereby varying torque about said axis resulting from said weight of said body, and
   (b) attaching a cam to said body and attaching a flexible member to a point on said cam and wrapping said flexible member on said cam by pivoting of said body and applying a spring force to said flexible member and contouring said cam to produce moment arms of varying distances from said axis through which said spring force is caused to act and producing torque equal and opposite to the torque resulting from said weight during pivoting of said body, and defining the cam profile as follows:

$$\frac{dP}{d\theta} = P \tan T, \tag{1}$$

$$\frac{dT}{d\theta} = \frac{\frac{dm}{d\theta} - m \tan T - KP^2(\cos^2 T + EP \sin T)}{- m \tan T + KP^2(\sin^2 T - EP \sin T)}, \tag{2}$$

$$A = \theta + C - T + EP \cos T, \tag{3}$$

where T (tau) is the angle between the radius vector and the normal to the cam profile at successive points; where K (kappa) is the nondimensional spring constant:

$$\kappa = kr_o^2/T_o,$$

where k is the spring rate; where E (epsilon) is the length ratio:

$$E = r_o/h,$$

where h is the distance between said horizontal axis and said fixed anchor; where $\theta$ is the degree of rotation; where $r_o$ is the maximum distance of the radius vector; where P (rho) is defined by:

$$P = r/r_o,$$

where r is the length of the radius vector at any cam angle; where the nondimensional applied torque or moment is defined by:

$$m = T_a/T_o,$$

where $T_o$ is a constant with dimensions of torque dependent on a particular embodiment; where $T_a$ is the applied varying torque resulting from said weight pivoting about said horizontal axis; where said radius vector extends from said horizontal axis to the point of tangency of said flexible member and said cam profile; where A (alpha) is the angle between said radius vector and a line from said horizontal axis to point of application of said vertical vector representing said weight of said body; where angle C varies between $\pi/2$ radians for generally vertical orientation of said spring force and zero radians for generally horizontal orientation of said spring force.

* * * * *